Aug. 29, 1967 G. HOWARD 3,338,151
BATCH PROCESSING APPARATUS INCLUDING TILTABLE RETORT
Filed Oct. 4, 1966 3 Sheets-Sheet 2

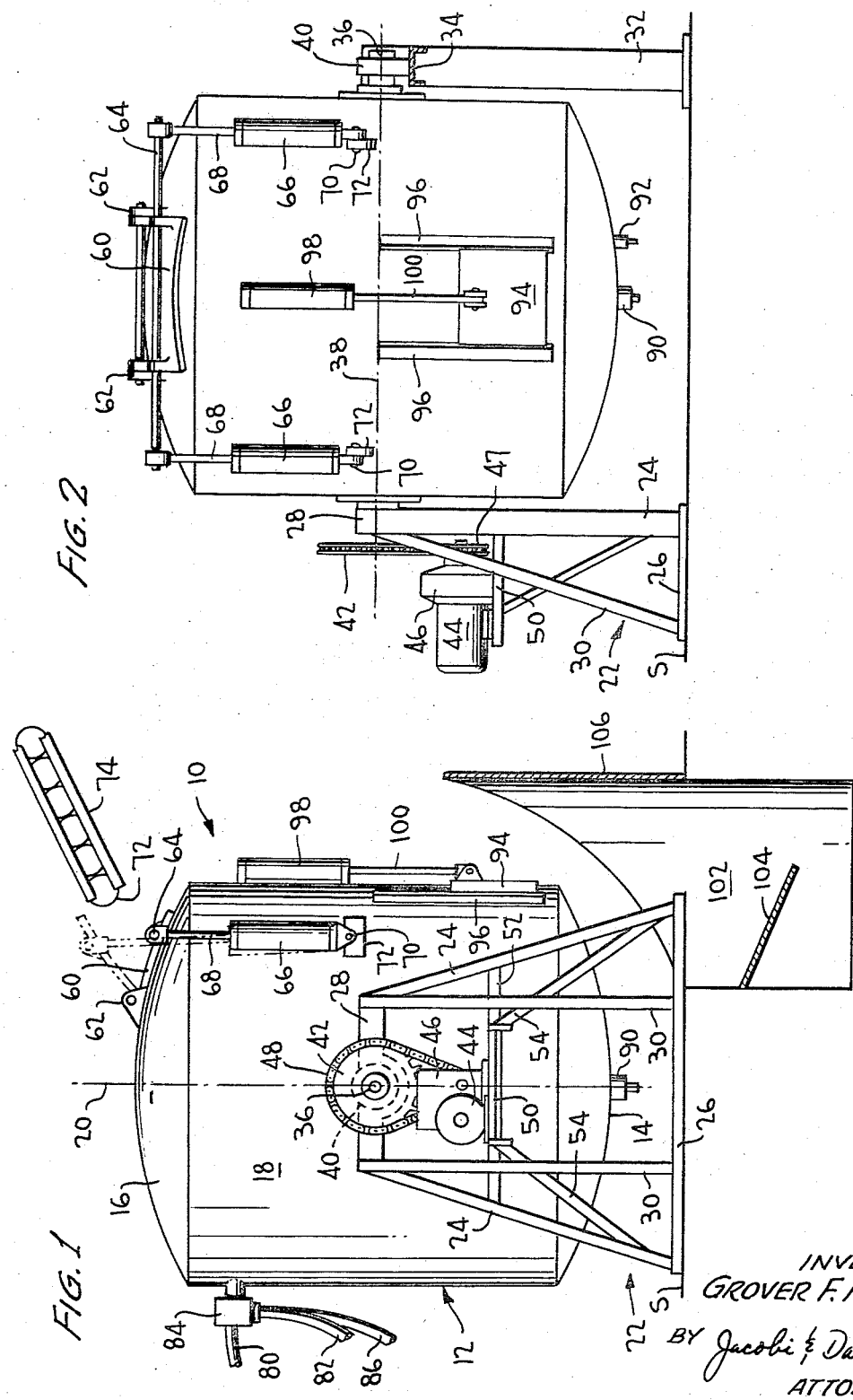

INVENTOR,
GROVER F. HOWARD
BY Jacobi & Davidson
ATTORNEYS

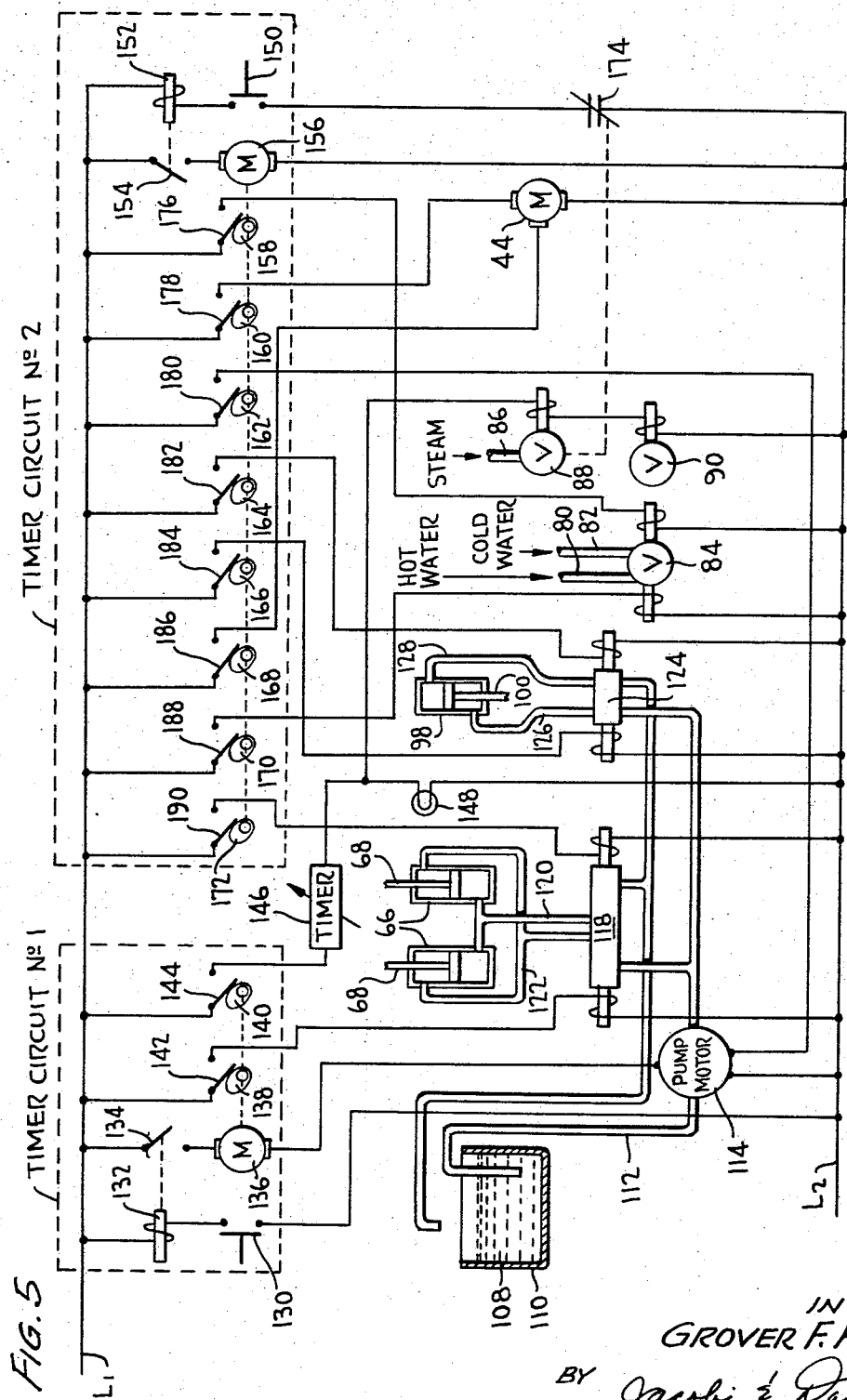

United States Patent Office 3,338,151
Patented Aug. 29, 1967

3,338,151
BATCH PROCESSING APPARATUS INCLUDING TILTABLE RETORT
Grover Howard, P.O. Box 5,
Westville, Okla. 74965
Filed Oct. 4, 1966, Ser. No. 584,134
8 Claims. (Cl. 99—251)

This invention relates to automatic batch processing apparatus useful in the treatment of canned products and other similar articles, and more particularly, this invention relates to such apparatus including an improved form of tiltable retort which operates in a simple efficient manner to enable the discharge flow rate of the processed articles to be readily controlled.

The invention set forth herein is an improvement and refinement of the invention set forth in my earlier United States Patent No. 3,209,673, issued Oct. 5, 1965. In such earlier patent, there was disclosed a batch processing apparatus including a tiltable retort in the form of a tank whose entire top was open and an enlarged cover or lid adapted to overlie the open top of such tank and to hermetically seal the same. When the tank of such earlier patent was being filled with cans or other similar articles, the entire lid was vertically lifted away from the tank, and when the filling was completed, the lid was vertically moved downward into hermetic sealing contact with the tank so that sterilization and other processing of the articles within the tank could be accomplished. Then, the cover again had to be vertically lifted away from the tank and held in a raised position while the entire tank was tilted about its axis of rotation to allow the processed articles to be spilled or discharged from the open top of the tank. Such tilting required that the entire tank be tilted or swung about its axis of rotation for a displacement substantially greater than 90°, and, in many instances, it was necessary to almost totally invert the tank so that the articles could spill from the open upper end thereof.

It has been discovered that utilizing the apparatus of my aforementioned patent creates certain difficulties in controlling the flow rate of the articles being discharged. That is, in the apparatus of my aforementioned patent, the tank was tilted toward its inverted position until the articles therein passed their angle of repose. Thereafter, all of the articles within the tank tended to flow outwardly under the influence of gravity, and as a result, many of the cans or other similar articles bumped against one another creating denting, crushing and buckling. It has also been recognized that the apparatus of my aforementioned patent necessarily required a longer operating time to process a batch of articles in view of the fact that more time was required to tilt the tank from its upright position to its almost inverted position, and to then return the tank back to its upright position. Still further, it has been recognized that additional framework had to extend well above the top of the tank so that the lid or cover could be lifted away from the tank to a height great enough to permit the tank to be tilted. Still further, it has been found that the very necessity of entirely removing the cover from the tank and for then returning the same into contact with the tank necessitated the use of separate locking or latching means to keep the cover hermetically sealed against the tank.

With the foregoing information in mind, it is, accordingly, an object of the present invention to provide an improved and refined form of batch processing apparatus including an improved form of tiltable retort.

Another object of the present invention is to provide a batch processing apparatus which permits ready control of the discharge flow rate of the processed articles.

Another object of the present invention is to provide a batch processing apparatus which operates more quickly and efficiently than those known heretofore and which therefore accomplishes an entire processing cycle in a faster time.

Another object of the present invention is to provide a batch processing apparatus which is simpler than apparatus known heretofore, which utilizes less moving parts, and which requires less individual operation and movement of mechanism to accomplish the desired processing techniques.

Other objects, advantages and salient features of the present invention will become apparent from the following detailed description which, taken in conjunction with the annexed drawings, discloses a preferred embodiment thereof.

Referring to the drawings:

FIGURE 1 is a side elevational view of apparatus in accordance with the principles of the present invention, such apparatus being shown in its normal or upright position;

FIGURE 2 is a front elevational view of the apparatus;

Figure 3:
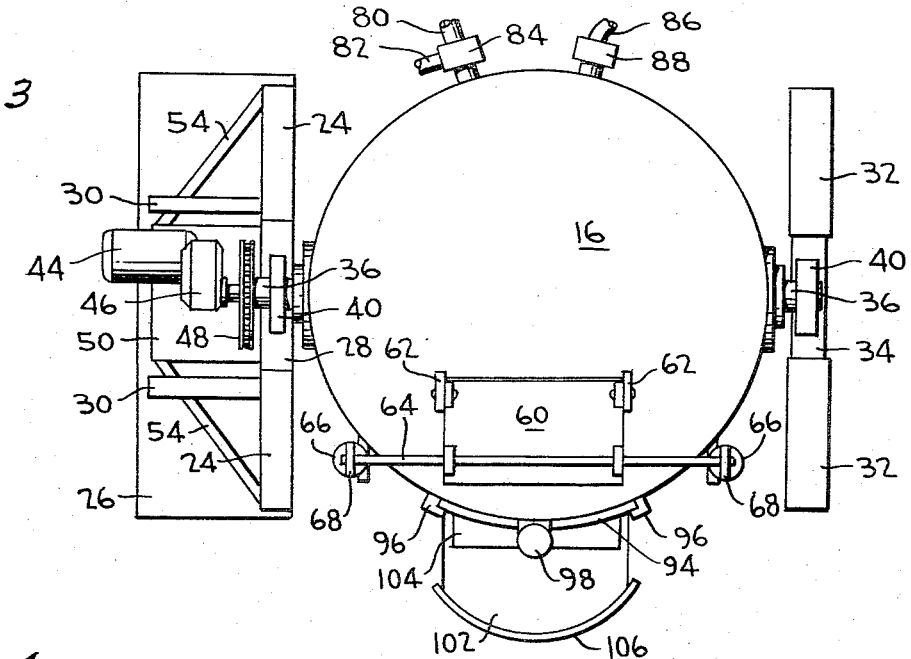
FIGURE 3 is a top plan view of the apparatus.

Referring now to FIGURE 1, there is shown therein apparatus in accordance with the principles of the present invention, such apparatus being generally designated 10. The apparatus includes a tiltable retort means generally designated 12 which comprises a large tank or container having a partially domed lower end wall 14 and a partially domed upper end wall 16. A substantially cylindrical side wall means 18 extends between the upper and lower end walls and is connected therewith, either integrally or by some suitable attachment means such as welding or the like. The retort has a central axis 20 which defines a substantially vertical axis and which can be imagined as extending centrally through the interior thereof in such a manner that the continuous side wall 18 is generated thereabout as a body of revolution.

A mounting means generally designated 22 is provided for movably positioning the tank 12 vertically above a supporting surface designated S. The mounting means 22 includes, on one side of the tank, a framework formed by a pair of legs 24, 24 which extend upwardly from the base plate 26 and converge angularly toward one another. A horizontal connecting strut 28 extends between these legs 24, 24 at substantially the midpoint of the tank 18. The legs 24, 24 extend substantially vertically and are hence in substantially parallel position with the central axis 20 of the tank 18. An additional set of supporting legs 30, 30 extend angularly inwardly toward the tank 18 and connect with the legs 24, 24 at their juncture with the supporting strut 28. As can best be seen from FIGURE 2, the supporting structure on the opposite side of the tank 12 includes a pair of upstanding angularly converging legs 32, 32, which are similar to the legs 24, 24, and also includes a substantially horizontal supporting strut 34 similar to the strut 28.

A stub shaft 36 extends from each side of the tank 12 substantially intermediate the side wall portion 18 thereof. The two stub shafts 36, 36 are coaxially aligned with one another along an axis 38 which defines the axis of rotation of the tank 12. Each stub shaft 36 carries a support member or bearing 40 rotatably mounted thereupon and these bearings abut against the horizontal supporting struts 28, 34 to support the tank 12 in vertically spaced relationship above the supporting surface S. Each of the struts 28 and 34 is provided with an arcuate central portion which acts as a guiding seat for the bearings 40. In this manner, the tank 12 can be lifted vertically upwardly to be removed from the supporting structure or mounting means, in the event that any repairs or modifications to the tank are necessary. However, when the tank is lowered into position on the mounting means, the bearings 40 will seat within the contoured guiding portions of the horizontal supporting struts and the tank 12 is hence free to rotate about the axis of rotation 38. As will be apparent, the disposition of the axis of rotation 38 is perpendicular to the central vertical axis 20.

Drive means must be connected with the tank 12 for effecting rotation thereof about the axis of rotation 38. To this end, an enlarged sprocket 42 is mounted at the outboard end of the stub shaft 40 which is directed toward the mounting means 22. A suitable reversible electric motor 44 is coupled with a gear box 46 which in turn drives a sprocket 47 that is connected via a chain drive 48 with the sprocket 42. The motor 44 and gear box 46 are supported upon a platform 50 disposed within the mounting means 22. The inner end of the platform is supported by a brace leg 52 which extends between the legs 24, 24. The outer end of the platform 50 is supported by a pair of outwardly extending angularly converging legs 54, 54 whose position can best be appreciated by reference to FIGURES 1 and 2. It will thus be appreciated that energization of the electric driving motor 44 will serve to effect a movement of the chain drive 48 and will thereby effect a rotation of the tank 12 about the axis of rotation 38. Naturally, the direction of tank tilting or rotation will be governed by the direction in which the driving motor 44 is operated.

As will be appreciated by reference to my aforementioned United States patent, the construction in such patent showed a tank wherein the entire upper end wall 16 was movable with respect to the remainder of the tank. Naturally, movement of this entire upper end wall was rather difficult, and on large units, this upper end wall was of considerable weight and magnitude. The present invention overcomes any difficulties in this regard, by providing an upper end wall 16 which is fixed with respect to the remainder of the tank. To permit communication with the interior of the tank, a small inlet opening means is disposed in the upper end wall, preferably in offset relation to the central axis 20 thereof. A cover means 60 in the form of a small plate or the like, is mounted in overlying relationship to the inlet opening means in the upper end wall, with the rear edge of the cover means 60 being pivotably or hingeably mounted. In the form shown, suitable upstanding spaced ears 62, 62 are provided at opposite edges at the rear of the cover plate 60, and pin means on the cover plate are disposed within these ears 62, 62, so as to permit a pivoting or swinging movement of the cover means 60. Operating means are provided in coupled relationship with the cover means 60 for effecting a raising and lowering thereof. Such operating means includes an elongated bar or rod 64 fixed to the cover plate 60 and extending laterally thereacross. A pair of operating piston and cylinder means 66, 66 are each provided with an extensible piston rod 68, 68. These piston rods, 68, 68, are pivotally mounted to the ends of the rod or bar 64. The lower ends of each of the piston and cylinder means 66 are pivotally mounted at 70 to a support bracket 72 which is fixed to the side wall 18 of the tank. It is preferred that a suitable sealing gasket means be provided either around the border of the inlet opening means or fixed to the peripheral edges of the cover means 60. Thus, when the operating cylinders 66 are energized to extend the piston rods 68 upwardly, the bar 64 will be raised and hence the cover means 60 will likewise be raised to the dotted line position shown in FIGURE 1. As will be explained hereinafter, when the cover means raised to its open position, the tank 12 is filled to a predetermined level with hot water. At this time, cans 72 or other suitable articles can be provided through an inclined track or conveyor means 74, as, for example, a track from a can seaming machine. These cans 72 can then drop through the inlet opening means and into the hot water in the interior of the tank 12. When the flow of cans 72 is terminated or interrupted, the cylinders 66 can be operated in a reverse manner to retract the rods 68 and to thereby move the cover means 60 into its solid line position of FIGURE 1. In this position, the sealing gasket means will assure that the inlet opening means is hermetically sealed.

Means are provided in the present invention to communicate with the interior of the tank 12 to permit introduction and removal of a variety of treating fluids for processing the cans or articles 72. Specifically, a hot water line and a cold water line 82 each communicate through a valve means 84 with the interior of the tank 12. The valve 84 is a solenoid actuated valve which, in its neutral position, blocks any water flow from communication with the tank 12. When the valve 84 is atcauted in one direction hot water will be admitted into the tank, and when the valve 84 is actuated in the opposite direction, cold water will be admitted to the tank. Steam is likewise provided for entry into the tank 12, such steam being admitted through a steam line 86. The steam line communicates with the interior of the tank through a solenoid actuated valve 88 and, if desired, suitable spreader means, not shown, but illustrated in my aforementioned patent, may be utilized to distribute the steam flow evenly along the interior of the tank 12.

For releasing water from the interior of the tank, a drain valve 90 is provided in the bottom end wall 14. This drain valve 90 can be a single-acting solenoid valve which is suitably biased to a closed position, but which opens when the coil thereof is energized. A suitable drain means may be formed in the supporting surface S so that fluid can drain thereinto. Alternatively, if desired, a conduit may be coupled with the valve 90 so that the exhausting liquid can be returned to a suitable source or reservoir containing such fluid.

As shown in FIGURE 2, a steam pressure relief valve 92 is also provided. Preferably, this valve is a unidirectional flow control valve having an adjustable biasing means. In this manner, it is possible to adjust the pressure at which the valve means 92 will open to release steam pressure from the interior of the tank 12.

In order to release the cans or articles from the interior of the tank, discharge opening means must be provided in the side wall 18. As can best be seen from FIGURES 1 and 2, the discharge opening means is provided along the front of the tank at a location below the vertical height of the axis of rotation 38 and above the lower end wall 14 of the tank. A gate means 94 is movably mounted with respect to the discharge opening means, and the side edges of the gate means 94 are disposed within vertically extending guide channels 96, 96 which are spaced apart along the forward portion of the tank side wall 18. Actuating means are coupled with the gate means 94 to effect movement thereof within the guide means 96. Such actuating means includes a cylinder and piston means 98 mounted on the side wall 18 of the tank and having an extensible piston rod 100 pinned to the gate means 94. Thus, when the piston rod 100 is in its extended position, as shown in FIGURES 1 and 2, the gate means 94 closes the discharge opening means. However, when the cylinder and piston means 98 retracts the piston rod 100, the gate means 94 is raised, as shown in FIGURE 4, to expose the discharge opening means which is designated D in FIGURE 4.

A suitable enlarged opening 102 can be provided in the supporting surface in front of the tank 12 so that the discharging cans can drop thereinto. A deflection wall 104 can be mounted within this opening and a surrounding cowl or shield 106 can be utilized to prevent any splashing or the like. As discussed in my aforementioned patent, suitable fluid may be utilized in the opening 102 to act as a hydraulic cushion for the discharging cans, and likewise, suitable conveyor means or the like, can be disposed therein. However, since these features do not form a specific part of the improvement of the present invention, there is no need to detail the same herein.

Figure 4:
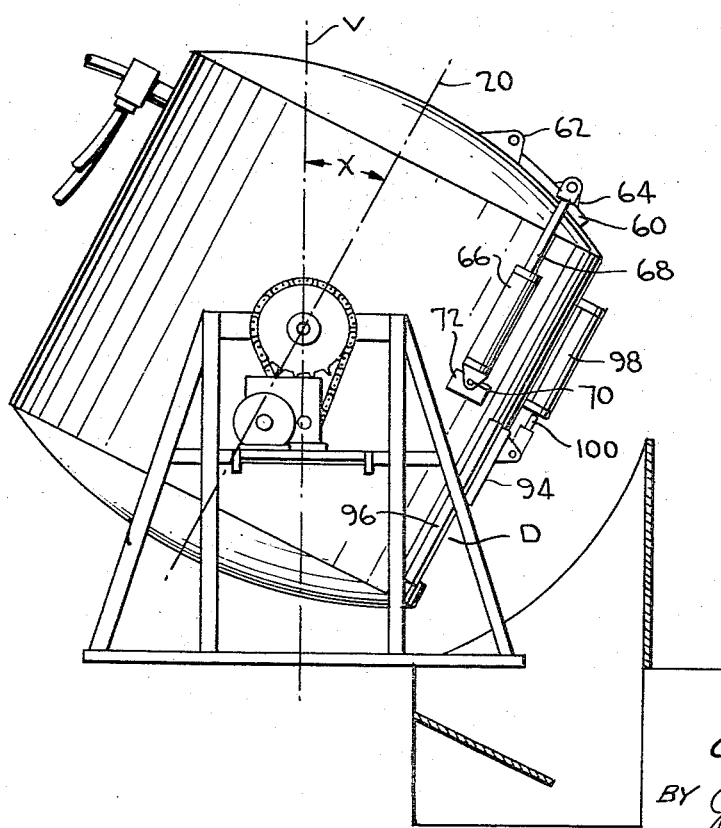
FIGURE 4 is a side elevational view of the apparatus, similar to that shown in FIGURE 1, but with the apparatus shown in its discharge position; and, FIGURE 5 is a schematic hydraulic and electrical circuit utilized in connection with the apparatus of the present invention.

It is important to note the relative movement which occurs from the time that the tank is in its normal upright position of FIGURE 1 and the time when the tank is in its discharge position of FIGURE 4. When the tank 12 has been tilted to its discharge position of FIGURE 4, the central axis 20 of the tank is displaced by an angular amount $x$ from a true vertical axis V or, in other words, from its original position as shown in FIGURE 1. The quantity of this angle $x$ can be varied, as desired, but in any event, the same should be an acute angle. It will, of course, be appreciated that the arrangement of the present invention requires only a small amount of tilting of the retort to accomplish the desired discharge of the treated articles or cans. By controlling and correlating the quantity of the angular displacement $x$, the size and position of the discharge opening means D and the amount by which the gate means 94 is opened, it is possible for an operator to carefully control the discharge flow rate as the cans exit from the tank 12. In contrast, the structure disclosed in my aforementioned patent required that the entire tank be virtually inverted to spill the cans out of the open top thereof, and in doing so, there was very little, if any, control of the discharge flow rate of the cans. An additional feature of the present invention, if desired, resides in the utilization of a suitable vibrator which can be coupled with the tank 12 to aid in discharging the cans therefrom. However, since the use of a vibrator for this purpose is a well-known expedient, it is not considered necessary to illustrate the same or to discuss the same further.

Operation of the present invention will become more apparent by reference to FIGURE 5 which shows a suitable form of schematic circuit, both electrical and hydraulic, for effecting an automatic operation of the present invention. The cylinder and piston means 66 and 98 are operated by a suitable source of hydraulic fluid 108 which is contained in a suitable tank or reservoir 110. A supply line 112 including a motor-pump unit 114 therein can be utilized to deliver the fluid 108 under pressure to the cylinder and piston means. A return line 116 can be utilized to return the exhausting fluid from the cylinder and piston means to the reservoir 110. Suitable valve means must be associated with the various cylinder and piston means to control the operation of the same, and in the preferred form, such valve means takes the form of a double acting solenoid operated valve means. At least one such solenoid valve means, designated 118, is associated with the cylinder and piston means 66. Both the supply line 112 and the return line 116 are connected with this valve 118. Likewise a line 120 extends from the valve 118 to the cylinders 66 to extend the piston rods 68 and another line 122 connected between the valve 118 and the cylinder 66 serves to retract the piston rods 68. It should thus be apparent that, in one position, the valve 118 couples the supply line 112 with the line 120 and the return line 116 with the line 122. In this position, fluid under pressure delivered by the pump means 114 causes the pistons to move in a direction to extend the piston rods 68. The fluid above the pistons is exhausted through the line 122, through the valve 118 and is returned through the return line 116 to the reservoir 110. Naturally, if the valve 118 is moved to its opposite position, exactly the reverse operation will occur. A similar double acting solenoid valve 124 is associated with the cylinder and piston means 98, with one line 126 connecting to one side of the piston and another line 128 connecting to the opposite side thereof. Again, if the valve 124 is in one position, fluid under pressure from the supply line 112 will be connected with the line 126 to hence raise the piston and the piston rod 100. The fluid above the piston will exhaust through the line 128 and will return through the return line 116 to the reservoir 110. When the valve 124 is moved to its opposite position, the reverse operation will occur.

Considering now the electrical circuit means, it must be appreciated that the apparatus 10 of the present invention is intended to operate substantially automatically. Therefore, two-timer circuits are provided, and in FIGURE 5, such circuits are designated timer circuit No. 1 and timer circuit No. 2. Operating power for the apparatus is supplied across a pair of suitable power lines L1, L2. To consider the operation of this apparatus, let it be assumed that in its initial position, the cover means 60 is open, the gate means 94 is closed, and the tank is filled with hot water to a predetermined level. The cans 72 or other articles to be processed and treated can then be dropped into the tank 12. When this occurs, the operator can start the automatic operation of the electrical system by depressing a push button 130. When this button is depressed, it energizes a starter solenoid 132 which, in turn, closes a switch 134 in a line containing a timer motor 136. When the switch 134 closes, the motor 136 is energized, and likewise, the pump motor 114 is energized. The motor 136 carries a shaft illustratively shown by a dotted line in FIGURE 5, and on this shaft, a pair of cam members 138 and 140 are mounted in spaced apart relationship. As the motor 136 operates, it rotates the cam 138 to a position where it closes a switch 142, which, in turn, moves the solenoid valve 118 to a first position. In this position, the line 122 communicates with the supply line 112 so that hydraulic fluid 108 under pressure is delivered by the pump motor 114 to the cylinders 66 to retract the piston rods 68 and to thereby close the cover means 60. The pressure will remain applied to the pistons in the cylinders 66 thereby imparting a positive force which holds the cover means 60 in its closed and hermetically sealed position. Operation of the timer motor 136 also causes the cam 140 to rotate to a position where the same closes the switch 144. Closure of this switch actuates a presettable timer mechanism 146, opens the steam valve 88 to admit steam through the line 86 to the interior of the tank, and opens the drain valve 90 to permit the hot water to discharge from the tank under the influence of gravity and the incoming pressure of the steam. A signal lamp 148 is connected across the timer 146 in such a manner that the lamp is illuminated when the timer is activated. Closure of the switch 144 and activation of the timer 146 serve to commence the sterilizing operation in the apparatus 10. After a preselected interval of time, depending upon the speed of the motor 136 and the shape of the cam 140, the switch 144 will again open. When this occurs, the drain valve 90 will close and the steam valve 88 will likewise close. However, since the timer 146 has been preset, the sterilizing operation within the tank will continue to operate for the preset interval of time. The indicating light 148 will likewise remain illuminated so long as sterilization continues. When the indicating light 148 is no longer illuminated, it serves as a signal to the operator that the canned products within the tank 12 have been suitably sterilized and that the same can now be discharged from the tank and conveyed to a suitable point of discharge, such as a can labeling machine.

To complete one cycle of operation of the apparatus 10, the operator, upon seeing that the indicating light 148 is no longer illuminated, depresses the push button 150 associated with timer circuit No. 2. Closure of this push button 150 energizes a starting solenoid 152 which closes a switch 154 in a line containing a second timer motor 156. With closure of the switch 154, the timer motor 156 is energized and the shaft associated therewith, as illustrated by the dotted line in FIGURE 5, is rotated. A series of spaced cams are provided on this shaft, such cams being designated 158, 160, 162, 164, 166, 168, 170 and 172. A safety interlock 174 is connected with timer circuit No. 2 to assure that the steam valve 88 cannot be inadvertently energized or activated during the operation of timer circuit No. 2. This precludes the possibility of live steam being introduced into the tank means 12 while either the cover means 60 or the gate means 94 are in an open position.

Rotation of the timer motor 156 causes the cam 158 to close a switch 176. When this switch closes, the solenoid water valve 84 is energized to admit cold water through the line 82 into the interior of the tank 12. As the cooling water enters the tank, the steam contained therein is discharged through the pressure relief valve 92. Naturally, when the cold water level is the tank reaches a predetermined level, the cam 158 permits the switch 176 to open, thereby terminating ingress of cold water.

Rotation of the cam 160 by the motor 156 causes a switch 178 to close. Closure of this switch energizes the driving motor 44 which, as aforementioned, causes the entire tank to tilt or rotate. The configuration of the cam 160 keeps the switch closed for a proper interval of time to enable the tank to tilt through the predetermined angle x. Then, the switch 178 opens and the tilting of the tank terminates.

Rotation of the cam 162 by the motor 156 closes a switch 180 which serves to energize the pump-motor 114. Then, rotation of the cam 164 closes the switch 182 to energize the solenoid valve 124 and to move the same to a position which permits opening of the gate means 94. Specifically, closure of the switch 182 moves the valve 124 to a position which permits fluid 108 under pressure to be delivered through the line 112 by the pump-motor 114, and through the line 126 to raise the piston rod 100 and the gate means 94 connected therewith. The shape of the cam 164 and its next adjacent cam 166 serves to control the length of time which the gate means 94 remains open, and hence, to control the length of time during which discharge from the tank can occur. When the cans have suitably discharged from the tank 12 through the discharge opening means D, the cam 164 opens the switch 182 and the next adjacent cam 166 closes a switch 184. This reverses the operation of the valve 124 so that the fluid under pressure from the supply line 112 feeds through the line 128 to cause the piston rod 100 to lower and to hence cause the gate means 94 to close.

Operation of the timer motor 156 also rotates a cam 168 which closes a switch 186 coupled with the driving motor 44. Thus, when the switch 186 is closed, the motor 44 will tilt the tank back to its vertical or upright position, as shown in FIGURE 1, whereupon, the cam 168 will again permit the switch 186 to open.

Thereafter, the cam 170 closes a switch 188 which moves the valve 84 to a position whereat hot water is admitted to the tank through the line 80. When a sufficient level of hot water has been reached within the tank, the cam 170 again opens the switch 188.

Finally, operation of the cam 172 closes the switch 190 which is linked with the valve means 118. This moves the valve means 118 to a position whereat the fluid under pressure from the line 112 is delivered through the conduit 120 to cause the piston rods 68 to extend and to thereby raise the cover means 60 on the tank. At this time, operation of the timer circuit No. 2 will have been completed and it will be appreciated that the tank is again filled with hot water and the cover means is again in an open position. Thus, at this time, it is possible to again energize the timer circuit No. 1 and the foregoing cycle can be repeated.

After reading the foregoing detailed description, it should be apparent that the objects set forth at the outset of the specification have been successfully achieved by the present invention.

What is claimed is:
1. Apparatus for batch processing of articles, comprising:
- a tank having spaced apart upper and lower end walls and a substantially cylindrical side wall extending therebetween;
- said tank having a central axis extending through the center of said upper and lower end walls and defining a vertical axis;
- mounting means for movably positioning said tank vertically above a supporting surface;
- said mounting means including support members coupled with said tank on opposite sides of said side wall;
- said support members being aligned along an axis which is disposed substantially intermediate said upper and lower end walls and which defines an axis of rotation;
- said axis of rotation being disposed perpendicularly to said central axis;
- inlet opening means disposed in said upper end wall to permit articles to be processed to be introduced into said tank;
- cover means movably mounted on said upper end wall;
- operating means coupled with said cover means for moving the same with respect to said inlet opening means;
- said operating means being operative to move said cover means to a first position whereat said inlet opening means is open to permit articles to be processed into said tank;
- said operating means also being operative to move said cover means to a second position whereat said cover means hermetically seals said inlet opening means to permit processing of the articles within said tank;
- means communicating with the interior of said tank to permit introduction of at least one treating fluid for processing articles within said tank;
- control means coupled with said means communicating with the interior of said tank to assure that said treating fluid can only be introduced when said cover means is in said second position;
- discharge opening means formed in said side wall at a location above said lower end wall and below the vertical height of said axis of rotation;
- gate means movable with respect to said discharge opening means;
- actuating means coupled with said gate means and being operative to effect movement thereof;
- said actuating means being operative to move said gate means to a first position whereat said gate means uncovers said discharge opening means to permit treated articles to be exited from said tank;
- said actuating means being operative to move said gate means to a second position whereat said gate means covers and seals said discharge opening means; and
- drive means operatively connected with said tank for rotating said tank about said axis of rotation, thereby displacing said central axis from a vertical position and thereby tilting said discharging opening means toward said supporting surface so that when said operating means moves said gate means to said first position, said articles processed within said tank are discharged toward said supporting surface;
- said displacement of said central axis from said vertical axis normally being an acute angle;
- said apparatus thus being operative to normally process articles in an upright position and being operative to discharge said processed articles after being displaced only an acute angular amount from said upright position whereby the discharge flow rate of the processed articles can be readily controlled.

2. Apparatus as defined in claim 1 wherein said operating means includes at least one cylinder and piston means adapted to receive pressurized fluid for moving said cover means between said first and second positions.

3. Apparatus as defined in claim 2 wherein said operating means further includes control valve means operative to direct said pressurized fluid into said cylinder and piston means in a manner which accomplishes the desired movement of said cover means.

4. Apparatus as defined in claim 3 wherein said actuating means further includes control valve means operative to direct said pressurized fluid into said cylinder and piston means in a manner which accomplishes the desired movement of said gate means.

5. Apparatus as defined in claim 1 wherein said actuating means includes at least one cylinder and piston means adapted to reecive pressurized fluid for moving said gate means between said first and second positions.

6. Apparatus as defined in claim 1 further including guide means fixed to said side wall, said gate means being guided by said guide means.

7. Apparatus as defined in claim 1 wherein said upper and lower end walls are fixed to said side wall.

8. Apparatus as defined in claim 1 wherein said cover means is pivotally attached to said upper end wall for swingable movement from between its first and second positions.

References Cited
UNITED STATES PATENTS

| | | | |
|---|---|---|---|
| 1,627,770 | 5/1927 | Durkee | 99—330 |
| 1,709,481 | 4/1929 | Mullen | 99—330 |
| 2,520,719 | 8/1950 | Hanson | 99—251 |
| 2,539,505 | 1/1951 | Barnum et al. | 99—214 |
| 2,555,230 | 5/1951 | Ford | 99—214 |
| 2,649,380 | 8/1953 | Flynn | 99—214 |
| 3,209,673 | 10/1965 | Howard | 99—215 |

WALTER A. SCHEEL, *Primary Examiner.*

R. W. JENKINS, *Assistant Examiner.*